United States Patent
Minopoli et al.

(10) Patent No.: US 11,693,781 B2
(45) Date of Patent: Jul. 4, 2023

(54) CACHING OR EVICTING HOST-RESIDENT TRANSLATION LAYER BASED ON COUNTER

(71) Applicant: Micron Technology, Inc., Boise, ID (US)

(72) Inventors: Dionisio Minopoli, Frattamaggiore (IT); Daniele Balluchi, Milan (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/947,851

(22) Filed: Aug. 20, 2020

(65) Prior Publication Data

US 2022/0058134 A1 Feb. 24, 2022

(51) Int. Cl.
*G06F 12/0866* (2016.01)

(52) U.S. Cl.
CPC .... *G06F 12/0866* (2013.01); *G06F 2212/311* (2013.01); *G06F 2212/7201* (2013.01)

(58) Field of Classification Search
CPC . G06F 2212/7201; G06F 3/0647–0649; G06F 12/0866; G06F 2212/311
See application file for complete search history.

(56) References Cited

U.S. PATENT DOCUMENTS

| | | | | |
|---|---|---|---|---|
| 2010/0332730 A1* | 12/2010 | Royer, Jr. | ............ | G06F 12/0246 711/103 |
| 2016/0371195 A1* | 12/2016 | Kim | .................... | G06F 12/0653 |
| 2020/0264973 A1* | 8/2020 | Lee | ..................... | G06F 12/0246 |
| 2020/0364157 A1* | 11/2020 | Byun | ................... | G06F 12/0246 |
| 2021/0133095 A1* | 5/2021 | Kim | ..................... | G06F 12/0871 |
| 2021/0263852 A1* | 8/2021 | Seok | .................... | G06F 12/0891 |

OTHER PUBLICATIONS

W. Jeong, H. Cho, Y. Lee, J. Lee, S. Yoon, J. Hwang, et al., "Improving flash storage performance by caching address mapping table in host memory", Proc. 9th USENIX Conf. Hot Topics Storage File Syst., pp. 19-19, 2017 (Year: 2017).*

\* cited by examiner

*Primary Examiner* — Chie Yew
(74) *Attorney, Agent, or Firm* — Lowenstein Sandler LLP

(57) ABSTRACT

A processing device in a memory system receives, from a host system, a read command comprising an indication of a sub-region of a logical address space of a memory device. The processing device increments a counter associated with a region of the logical address space, the region comprising a plurality of sub-regions including the sub-region, the counter to track a number of read operations performed on the plurality of sub-regions of the region, wherein the counter is periodically decremented in response to an occurrence of a recency event on the memory device. The processing device further determines whether a value of the counter satisfies a cacheable threshold criterion and, responsive to the value of the counter satisfying the cacheable threshold criterion, sends, to the host system, a recommendation to activate the sub-region.

9 Claims, 6 Drawing Sheets

CACHING OR EVICTING HOST-RESIDENT TRANSLATION LAYER BASED ON COUNTER

TECHNICAL FIELD

Embodiments of the disclosure relate generally to memory sub-systems, and more specifically, relate to a memory access tracking in memory sub-systems for a host-resident translation layer.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
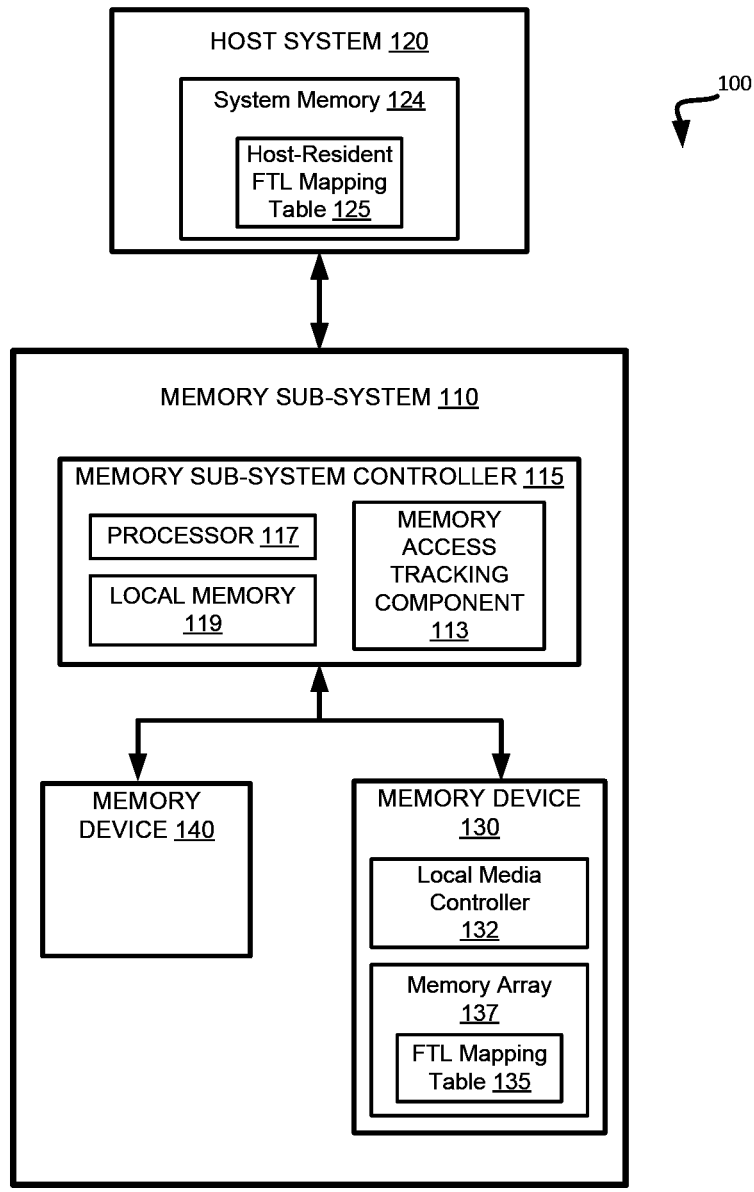
FIG. 1 illustrates an example computing system that includes a memory sub-system in accordance with some embodiments of the present disclosure.

Aspects of the present disclosure are directed to a host-resident translation layer write command for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described below in conjunction with FIG. 1. A non-volatile memory device is a package of one or more die. Each die can consist of one or more planes. For some types of non-volatile memory devices (e.g., NAND memory devices), each plane consists of a set of blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Certain non-volatile memory devices use a Flash Translation Layer (FTL) to translate logical addresses of memory access requests, often referred to as logical block addresses (LBAs), to corresponding physical memory addresses, such as physical block addresses (PBAs), which can be stored in one or more translation layer mapping tables. LBAs can be the logical addresses used by a host system for managing data. Many host systems and memory sub-system controllers often lack sufficient memory to maintain an entire translation layer mapping table in a cache. Therefore, portions of the translation layer mapping table can be retrieved from the memory device on demand, which can cause random read performance degradation. In some instances, the translation layer mapping table can be referred to as a logical-to-physical (L2P) mapping table storing L2P mapping information.

In order to improve random read performance, certain host systems utilize host-resident memory as a cache for at least a portion of the translation layer mapping table, for example in conjunction with the Host Performance Booster (HPB) feature of the JEDEC standard. Since the host-resident memory is limited, only some subset of the entire translation layer mapping table is maintained by the host system. This host-resident translation layer mapping table can be referred to in some instances as an HPB entry table. Translation layer mapping information can be read from this host-resident memory faster than from the memory device, and the host system can initiate a memory operation by retrieving, from the host-resident memory, a physical block address (PBA) of data stored in the memory device and including the PBA in a memory access request conveyed to the memory sub-system. The PBA can be retrieved by the host system from the host-resident memory using the LBA of the host data. Upon receiving the memory access request, the memory sub-system can immediately retrieve the data associated with the physical address from the memory device without the delay associated with accessing the flash memory-based translation layer mapping table and using the LBA to obtain the physical address.

Any time the host system writes data to the LBAs which are represented in the translation layer mapping information cached in the host-resident memory, the corresponding physical addresses are changed. In addition, the memory sub-system can regularly perform certain memory management operations (e.g., garbage collection) which results in data being rewritten to a new physical address. Accordingly, the portion of the translation layer mapping table cached in the host-resident memory regularly becomes invalid. During any typical workload with mixed read and write operations to the same region of LBAs, the invalidation of the logical to physical mappings in the translation layer mapping table is very frequent. As a result, the host system might issue read commands with an invalid PBA or have to request updated translation layer mapping information to replace the host-resident translation layer mapping information (e.g., issue an HPB Read Buffer command). Since the size of the translation layer mapping table on the host system is limited, once full, any time new translation layer mapping information is to be added, a determination must be made on which translation layer mapping information to remove from the translation layer mapping table to make the necessary space. When operating in a device control mode, the memory sub-system provides recommendations to the host system regarding which regions or sub-regions to activate (i.e., which regions should have the corresponding translation layer mapping information stored in the host-resident translation layer mapping table) or deactivate (i.e., which regions should have the corresponding translation layer mapping information removed from the host-resident translation layer mapping table). The recommendations can be based, for example, on the most frequently or least frequently accessed logical block addresses, the most recently or least recently accessed logical block addresses, etc. Many workloads over a period of time can span large amounts of the storage capacity of the memory sub-system with different temporal and spatial localities depending on the specific usage profile. Accordingly, data usage tracking can be a complex and resource-intensive process. Many existing solutions are inefficient and result in increased data traffic between the host system and memory sub-system, increased latency in servicing memory access requests, decreased quality of service for the host system, and an increase in unnecessary operations performed by the memory sub-system.

Aspects of the present disclosure address the above and other deficiencies by implementing memory access tracking in memory sub-systems for a host-resident translation layer. In one embodiment, a memory access tracking component of a memory sub-system maintains a number of counters, each to track a number or read access operations performed on a corresponding region of a logical address space of a memory device. The counter for a given region is incremented each time a read operations is performed on one of the sub-regions associated with the region. In one embodiment, the counter is incremented only if a transfer length of the read operation (i.e., an amount of data requested to be read from the memory device) satisfies a length threshold criterion (e.g., is less than a threshold length, such as 32 kilobytes). Depending on the embodiment, the counter can be incremented either by a fixed amount (e.g., 1) or by an amount based on the transfer length of the read operation. In one embodiment, the memory access tracking component determines whether the values of the counters satisfy at least one of a cacheable threshold criterion or an evictable threshold criterion. If the counter for a certain region satisfies the cacheable threshold criterion (e.g., meets or exceeds a cacheable threshold value), the memory access tracking component can recommend to the host system that one or more sub-regions of the region be activated (i.e., that one or more translation layer entries including logical-to-physical address mapping for the sub-region be stored in a host-resident translation layer mapping table on the host system). If the counter for a certain region satisfies the evictable threshold criterion (e.g., is less than an evictable threshold value), the memory access tracking component can identify the region as evictable (i.e., that any translation layer entries for a sub-region of that region can be evicted from the host-resident translation layer mapping table when space is needed). In one embodiment, the memory access tracking component maintains indications of evictable regions on an eviction list.

In one embodiment, the memory access tracking component can periodically decrement the counter in order to avoid over-saturation of the counters. The counters can be decremented in response to the occurrence of a recency event on the memory device. In one embodiment, a recency event occurs when a number of counters which are saturated (i.e., have reached a maximum storable value) satisfies a saturation threshold criterion (e.g., meets or exceeds a saturation threshold value). In another embodiment, a recency event occurs when a number of active regions of the memory device satisfies an active threshold criterion (e.g., meets or exceeds an active threshold value) and a number of regions on the eviction list satisfies a list threshold criterion (e.g., is less than a list threshold value). In response to the occurrence of a recency event, the memory access tracking component can decrement each of the counters (regardless of whether or not those counters triggered the recency event) by either a fixed amount or a percentage/fraction (e.g., reduce the counter value by one half).

Advantages of this approach include, but are not limited to, improved tracking of the utilization and access frequency of the various regions and sub-regions of the logical address space of the memory device. This improved tracking can be used to generate improved recommendations when the memory sub-system is operating in a device-control mode, thereby resulting in the proper translation layer mapping information being stored in the host-resident translation layer mapping table on the host system. As such, the number of read commands that deliver valid physical addresses stored in the host-resident translation layer mapping table is increased. Accordingly, the number of HPB read buffer commands that update the host-resident translation layer mapping table with updated physical addresses corresponding to the LBAs stored therein is decreased. Together, these factors result in decreased data traffic between the host system and memory sub-system, decreased latency in servicing memory access requests, increased quality of service for the host system, and a decrease in unnecessary operations performed by the memory sub-system, allowing bandwidth to be made available for performing other operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. In one embodiment, host system 120 includes a volatile memory, such as system memory 124, which stores host-resident translation layer mapping table 125.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, universal flash storage (UFS), Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. In addition, in one embodiment, memory array 137 can include translation layer mapping table 135.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In one embodiment, the memory sub-system 110 includes a memory access tracking component 113 that monitors the number of memory access operations (e.g., read operations) associated with multiple regions of a logical address space of memory device 130 in order to recommend the regions or sub-regions for which flash translation layer (FTL) mapping information is to be stored in the host-resident translation layer mapping table 125 of host system 120. In one embodiment, memory access tracking component 113 receives, from host system 120, a memory access command, such as a host-resident translation layer read command including an indication of a sub-region of a logical address space of memory device 130. In response, memory access tracking component 113 increments a counter associated with a region of the logical address space. The region can include multiple sub-regions, including the sub-region indicated in the received memory access command. This counter can track a number of read operations performed on the multiple sub-regions of the region. In one embodiment, as described in more detail herein, this counter is periodically decremented in response to an occurrence of a recency event on memory device 130. Upon incrementing or decrementing the counter, memory access tracking component 113 determines whether the value of the counter satisfies a cacheable threshold criterion and, responsive to the value of the counter satisfying the cacheable threshold criterion, sends, to host system 120, a recommendation to activate the sub-region (i.e., to store one or more translation layer entries including logical-to-physical address mapping for the sub-region in host-resident translation layer mapping table 125). Memory access tracking component 113 can subsequently receive, from host system 120, a host-resident translation layer read buffer command including an indication of the sub-region. In response, memory access tracking component 113 can perform a read operation to retrieve, from flash-based translation layer mapping table 135 stored in a memory array 137 of memory device 130, the translation layer entries associated with the sub-region and send, to host system 120, a response to the host-resident translation layer read buffer command, the response including the translation layer entries associated with the sub-region. Host system 120 can store the translation layer entries in host-resident translation layer mapping table 125, thereby activating the corresponding sub-region. Further details with regards to the operations of memory access tracking component 113 are described below.

In some embodiments, the memory sub-system controller 115 includes at least a portion of memory access tracking component 113. For example, the memory sub-system controller 115 can include a processor 117 (processing device) configured to execute instructions stored in local memory 119 for performing the operations described herein. In some embodiments, memory access tracking component 113 is part of the host system 120, an application, or an operating system.

Figure 2:
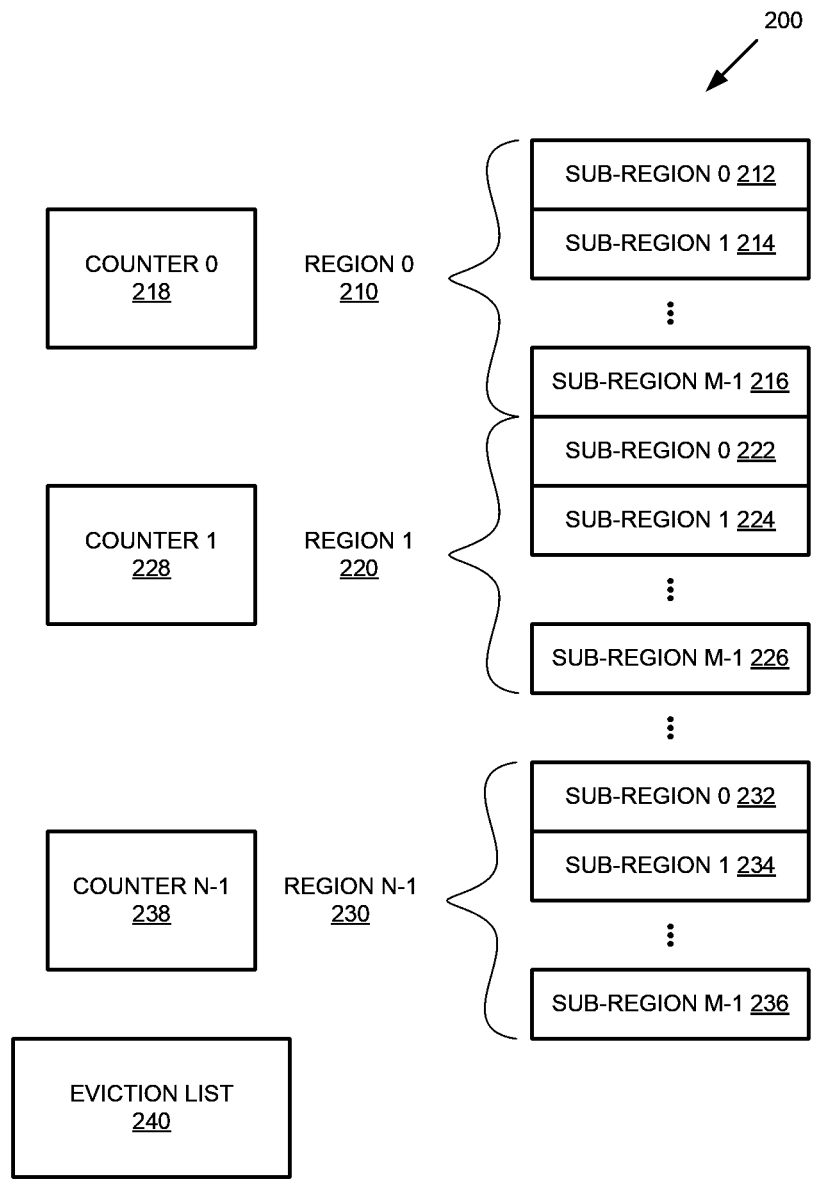
FIG. 2 is a block diagram illustrating a logical address space of a memory device divided into regions in accordance with some embodiments of the present disclosure.

FIG. 2 is a block diagram illustrating a logical address space 200 of a memory device 130 divided into regions in accordance with some embodiments of the present disclosure. In one embodiment, the logical address space is divided into a number of separated regions, which can also be referred to as HPB regions. For example, there can be N regions 210, 220, 230. Each of regions 210, 220, 230 can be equally sized, although region 230 might be smaller if the total size of the logical address space 200 is not an integer multiple of the region size. Each of the regions 210, 220, 230 can be further divided into a number of separated sub-regions, which can also be referred to as HPB sub-regions. In one embodiment, there can be M sub-regions in each region. For example, region 210 can include sub-regions 212, 214, 216, region 220 can include sub-regions 222, 224, 226, and region 230 can include sub-regions 232, 234, 236. Each of the sub-regions can be equally sized, although sub-region M-1 216, 226, 236 of each region might be smaller if the region size is not an integer multiple of the sub-region size. In other embodiments, there can be some other number of regions and/or sub-regions, and the regions and/or sub-regions can have different sizes.

In one embodiment, flash-based translation layer mapping table 135 maintains a number of translation layer entries corresponding to the logical address space 200. Each translation layer entry includes the physical address of a corresponding logical block address. In one embodiment, host system 120 can send a request (e.g., a HPB read buffer command) for a subset of the entries in flash-based translation layer mapping table 135 and store that subset in host-resident translation layer mapping table 125. In one embodiment, the translation layer entries for all of the logical block addresses in a given sub-region are transferred to host system 120 together in response to the request. Thus, host-resident translation layer mapping table 125 can include translation layer entries for one or more sub-regions of the logical address space 200. Those sub-regions for which the translation layer entries are stored in host-resident translation layer mapping table 125 are referred to as "active" sub-regions. A region of logical address space 200 can be considered active if it includes at least one active sub-region. For example, if the translation layer entries, including the corresponding physical addresses on memory device 130, corresponding to the logical addresses in sub-region 212 are cached in host-resident translation layer mapping table 125, sub-region 212 and region 210 are both considered to be active.

In one embodiment, when operating in a device control mode, memory access tracking component 113 provides recommendations to host system 120 regarding which regions or sub-regions to activate or deactivate. The recommendations can be based, for example, on the most frequently accessed logical block addresses, the most recently accessed logical block addresses, etc. In one embodiment, memory access tracking component 113 maintains a number of counters 218, 228, 238, each to track a number or read access operations performed on a corresponding one of regions 210, 220, 230. The counter for a given region is incremented each time a read operation is performed on one of the sub-regions associated with the region. For example, memory access tracking component 113 can increment counter 218 for each read operation directed to any of sub-regions 212, 214, 216. Similarly, memory access tracking component 113 can increment counter 228 for each read operation directed to any of sub-regions 222, 224, 226, and can increment counter 238 for each read operation directed to any of sub-regions 232, 234, 236. In one embodiment, the counters are incremented only if a transfer length of a read operation (i.e., an amount of data requested to be read from the memory device) satisfies a length threshold criterion (e.g., is less than a threshold length, such as 32 kilobytes). Depending on the embodiment, the counters can be incremented either by a fixed amount (e.g., 1) or by an amount based on the transfer length of the read operation. In one embodiment, memory access tracking component 113 can divide the transfer length by a read size for the memory sub-system 110 to determine an increment amount. For example, if the transfer length is 32 KB, memory access tracking component 113 can divide that by a 4 KB read size, resulting in an increment amount of 8.

In one embodiment, memory access tracking component 113 determines whether the values of counters 218, 228, 238 satisfy at least one of a cacheable threshold criterion or an evictable threshold criterion. If the value of a counter for a certain region satisfies the cacheable threshold criterion (e.g., meets or exceeds a cacheable threshold value), memory access tracking component 113 can recommend to the host system that one or more sub-regions of the region be activated. If the counter for a certain region satisfies the evictable threshold criterion (e.g., is less than an evictable threshold value), memory access tracking component 113 can identify the region as evictable. In one embodiment, memory access tracking component 113 maintains indications of evictable regions on an eviction list 240.

In one embodiment, memory access tracking component 113 can periodically decrement the counters 218, 228, 238 in order to avoid over-saturation of the counters. All counters 218, 228, 238 can be decremented in response to the occurrence of a recency event on memory device 130. In one embodiment, a recency event occurs when a number of counters which are saturated (i.e., have reached a maximum storable value) satisfies a saturation threshold criterion (e.g., meets or exceeds a saturation threshold value). In another embodiment, a recency event occurs when a number of active regions of memory device 130 satisfies an active threshold criterion (e.g., meets or exceeds an active threshold value) and a number of regions on the eviction list 240 satisfies a list threshold criterion (e.g., is less than a list threshold value). In response to the occurrence of a recency event, 218, 228, 238 can decrement each of the counters 218, 228, 238 by either a fixed amount or a percentage/fraction (e.g., reduce the counter value by one half).

In response to receiving a recommendation for activation, the host system 120 can request the translation layer entries corresponding to the recommended region or sub-region. In another embodiment, when operating in a host control mode, host system 120 decides which region or sub-regions to activate or deactivate without input from memory sub-system 110.

Figure 3:
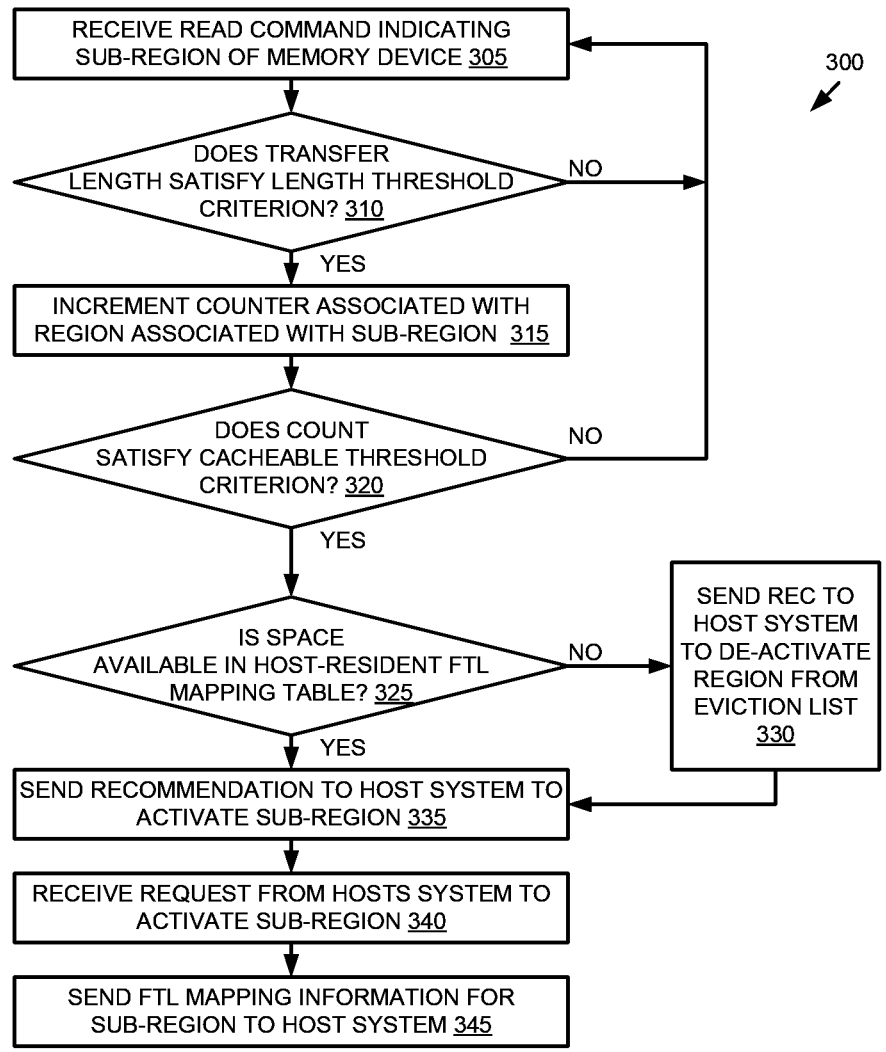
FIG. 3 is a flow diagram of an example method of memory access tracking in memory sub-systems for a host-resident translation layer in accordance with some embodiments of the present disclosure.

FIG. 3 is a flow diagram of an example method of memory access tracking in memory sub-systems for a host-resident translation layer in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by memory access tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, a memory access command is received. For example, the processing logic (e.g., processor 117) of a memory sub-system controller, such as memory sub-system controller 115, receives, from host system 120, the memory access command, such as a read command. In one embodiment, the read command includes an indication of one or more sub-regions, such as sub-region 212 and/or other sub-regions, of a logical address space, such as logical address space 200, of a memory device, such as memory device 130. For example, the read request can include one or more logical block addresses associated with sub-region 212 and/or other sub-regions. In one embodiment, the one or more sub-regions are identified using an initial logical block address and associated transfer size information including with the read command.

At operation 310, it is determined whether the memory access command satisfies a criterion. For example, the processing logic determines whether a transfer length associated with the read command satisfies a length threshold criterion. The transfer length represents an amount of data requested to be read from the memory device 130 in the memory access command. For example, the logical block address can include a range of address representing data in the sub-region 212 or an initial address and a length representing data in the sub-region 212. In one embodiment, memory access tracking component 113 compares the transfer length to a threshold length (e.g., 32 KB or some other length). If the transfer length is less than or equal to the threshold length, memory access tracking component 113 can determine that the length threshold criterion is satisfied (i.e., the read operation is part of a random read operation). If the transfer length is greater than the threshold length, memory access tracking component 113 can determine that the length threshold criterion is not satisfied (i.e., the read operation is part of a sequential read operation). If the length threshold criterion is not satisfied, the read command is executed but the current value of a counter, such as counter 218 associated with the region 210 is maintained, and processing returns to operation 305 when another memory access command is received.

Figure 5:
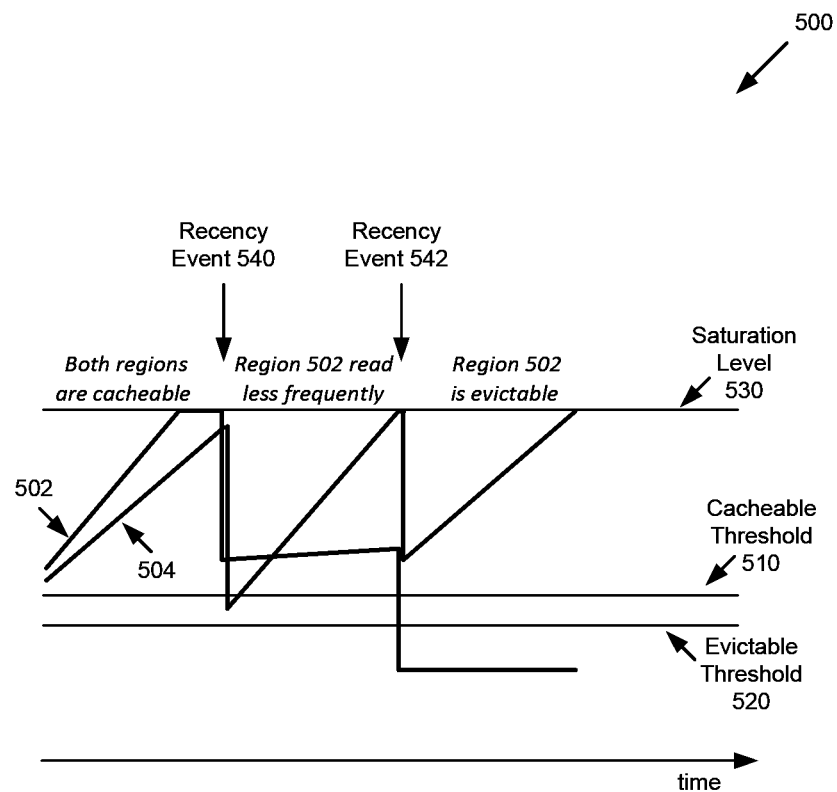
FIG. 5 is a graph illustrating memory access tracking in memory sub-systems for a host-resident translation layer over time in accordance with some embodiments of the present disclosure.

If the length threshold criterion is satisfied, at operation 315, a counter is incremented. For example, the processing logic can increment counter 218 associated with region 210. Region 210 includes a number of sub-regions 212, 214, 216, including the sub-region 212 to which the read command was directed. Depending on the embodiment, memory access tracking component 113 can increment counter 218 either by a fixed amount (e.g., 1) or by an amount based on the transfer length of the read operation. In one embodiment, memory access tracking component 113 can divide the transfer length by a read size for the memory sub-system 110 to determine an increment amount. For example, if the transfer length is 32 KB, memory access tracking component 113 can divide that by a 4 KB read size, resulting in an increment amount of 8. For example, FIG. 5 illustrates a graph 500 of the fluctuation of the count value 502 for a first counter and the counter value 504 for a second counter over time. The corresponding count values 502 and 504 increase over time as the first counter and the second counter are incremented, as described at operation 315.

Referring again to FIG. 3, at operation 320, it is determined whether the counter satisfies a criterion. For example, upon incrementing counter 218, the processing logic can determine whether a value of counter 218 satisfies a cacheable threshold criterion. In one embodiment, memory access tracking component 113 compares the value of counter 218 to a cacheable threshold value. For example, FIG. 5 illustrates a cacheable threshold value 510. If the count value of a counter is greater than or equal to the cacheable threshold value 510, memory access tracking component 113 can determine that the cacheable threshold criterion is satisfied (i.e., that translation layer mapping information for sub-regions of the region 210 with which counter 218 is associated are cacheable in host-resident translation layer mapping table 125). If the count value is less than the cacheable threshold value, memory access tracking component 113 can determine that the cacheable threshold criterion is not satisfied. If, at operation 320, it is determined that the cacheable threshold criterion is not satisfied, the read command is executed without any updates being made to host-resident FTL mapping table 125, and processing returns to operation 305 when another memory access command is received.

If the cacheable threshold criterion is satisfied, at operation 325, it is determined whether space is available in a mapping table. For example, the processing logic can determine whether space is available in host-resident translation layer mapping table 125 in host system 120. In one embodiment, memory access tracking component 113 tracks a number of translation layer entries including logical-to-physical address mapping for sub-regions which are currently stored in host-resident translation layer mapping table 125. In one embodiment, each translation layer entry represents the translation layer mapping information for one block of data (e.g., 4 kB). Knowing the size of a translation layer entry (e.g., 8 bytes) and the total capacity of host-resident translation layer mapping table 125, memory access tracking component 113 can determine a maximum number of active sub-regions. In another embodiment, the host system can indicate to the memory sub-system the maximum number of sub-regions that can be activated based on the capacity of host-resident translation layer mapping table 125. Thus, memory access tracking component 113 can compare a current number of active regions to the maximum number of active regions. If the current number is less than the maximum number, memory access tracking component 113 can determine that space is available in host-resident translation layer mapping table 125. If the current number is equal to than the maximum number, memory access tracking component 113 can determine that space is not available in host-resident translation layer mapping table 125.

If space is not available in host-resident translation layer mapping table 125, at operation 330, a recommendation is sent. For example, the processing logic can send, to host system 120, a recommendation to de-activate a region, such as at least one region indicated by eviction list 240. In one embodiment, memory access tracking component 113 identifies a region, such as a first region, a last region, a most recently added region, a least recently added region, etc., from the eviction list 240 and sends the recommendation indicating the identified region to host system 120. In response to receiving the recommendation, host system 120 can delete all of the translation layer entries associated with the identified region from host-resident translation layer mapping table 125 to free space for new translation layer entries.

If space is available in host-resident translation layer mapping table 125, at operation 335, a recommendation is sent. For example, the processing logic can send, to host system 120, a recommendation to activate the sub-region 212 associated with the read operation. At operation 340, a request is received. For example, the processing logic can receive a request (e.g., an HPB read buffer command) including an indication of the sub-region 212. In one embodiment, memory access tracking component 113 receives the request and performs a read operation to retrieve one or more translation layer entries stored in translation layer mapping table 135 on memory device 130. Those one or more translation layer entries are associated with the sub-regions 212 indicated in the request. As described above, each translation layer entry includes the physical address of a corresponding logical block address in the identified sub-regions. At operation 345, a response is sent. For example, the processing logic can send, to host system 120, a response to the HPB read buffer command. In one embodiment, the response includes the one or more translation layer entries obtained from translation layer mapping table 135 on memory device 130. Host system 120 can store the one or more translation layer entries in the host-resident translation layer mapping table 125, thereby activating the corresponding sub-regions.

Figure 4:
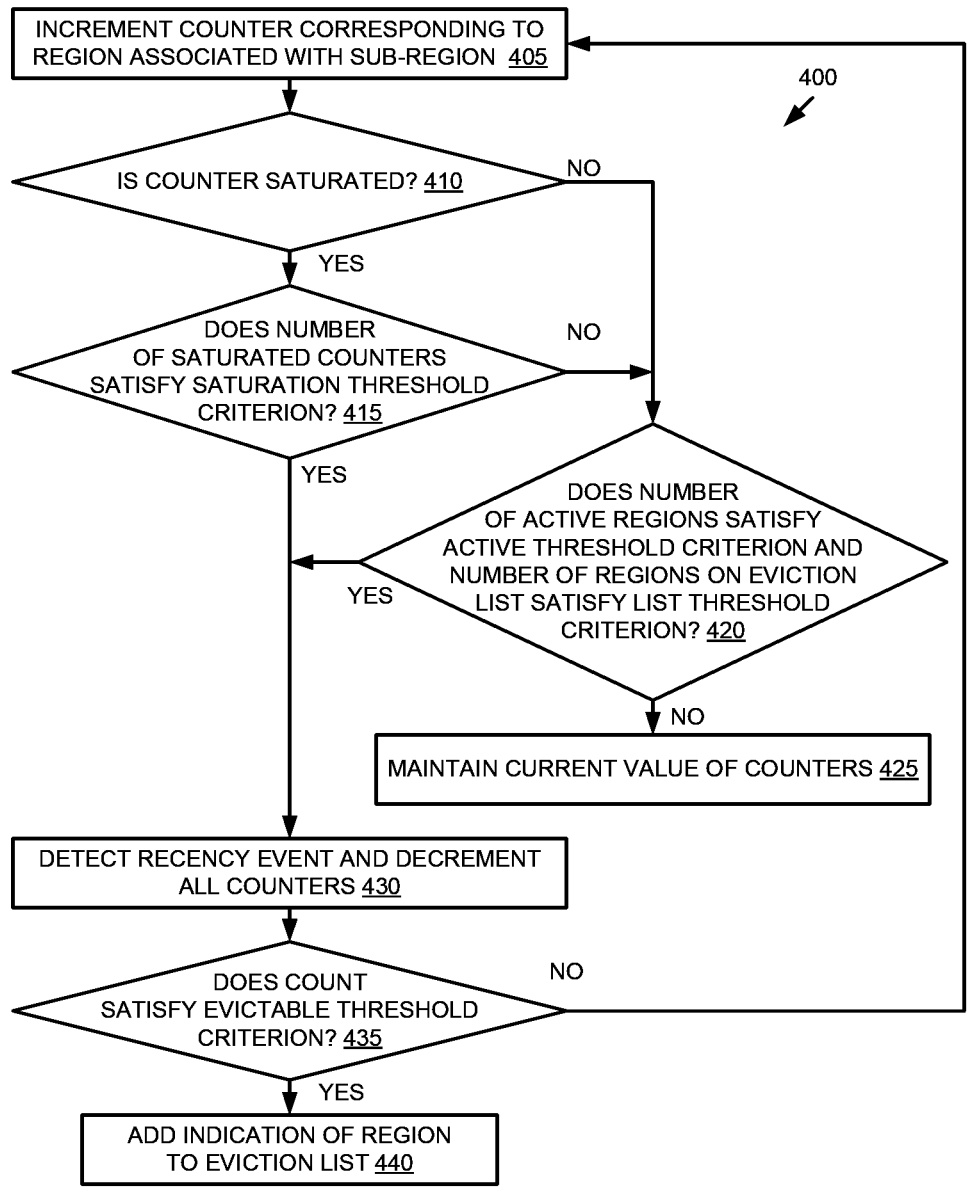
FIG. 4 is a flow diagram of an example method of counter management for memory access tracking in accordance with some embodiments of the present disclosure.

FIG. 4 is a flow diagram of an example method of counter management for memory access tracking in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by memory access tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, a counter is incremented. For example, the processing logic can increment a counter, such as counter 218, associated with region of the logical address space 200, such as region 210. Region 210 includes a number of sub-regions 212, 214, 216, including the sub-region 212 to which a read command was directed. Depending on the embodiment, memory access tracking component 113 can increment counter 218 either by a fixed amount (e.g., 1) or by an amount based on the transfer length of the read operation. In one embodiment, memory access tracking component 113 can divide the transfer length by a read size for the memory sub-system 110 to determine an increment amount. For example, if the transfer length is 32 KB, memory access tracking component 113 can divide that by a 4 KB read size, resulting in an increment amount of 8.

At operation 410, a status of a counter is determined. For example, the processing logic can determine whether the counter 218 is saturated (i.e., has reached a maximum storable value). For example, FIG. 5 illustrates a saturation level 530 that represents the maximum storable value. Since the counter 218 is implemented with a certain size (e.g., 8 bits), there is a maximum storable value, above which the counter cannot be incremented further. Thus, in one embodiment, memory access tracking component 113 compares the current value of the counter to the maximum storable value (i.e., saturation level 530). If the current value is less than the maximum storable value, memory access tracking component 113 can determine that the counter is not saturated. If the current value is equal to the maximum storable value, memory access tracking component 113 can determine that the counter is saturated.

In response to determining that the counter is saturated, at operation 415, a number of saturated counters is evaluated. For example, the processing device can determine whether a number of saturated counters of memory device 130 satisfies a saturation threshold criterion. In one embodiment, memory access tracking component 113 can determine the number of saturated counters and compare the number of saturated counters to a saturation threshold (e.g., 25% of the total number of counters/regions). If the number of saturated counters is greater than or equal to the saturation threshold, memory access tracking component 113 can determine that the saturation threshold is satisfied. If the number of saturated counters is less than the saturation threshold, memory access tracking component 113 can determine that the saturation threshold is not satisfied.

In response to determining, at operation 410, that the counter is not saturated, or determining, at operation 415, that the saturation threshold is not satisfied, at operation 420, a number of evictable regions is evaluated. For example, the processing logic can determine whether a number of active regions for which translation layer mapping data is stored in the host-resident translation layer mapping table 125 satisfies an active threshold criterion (e.g., is greater than an active threshold value) and a number of counters having a value that satisfies the eviction threshold (i.e., a number of regions indicated on eviction list 240) satisfies a list threshold criterion. In one embodiment, memory access tracking component 113 can determine the number of regions indicated on eviction list 240 and compare the number of regions to a list threshold value (e.g., 100). If the number of regions is less than or equal to the list threshold value, memory access tracking component 113 can determine that the list threshold is satisfied. If the number of saturated counters is greater than the list threshold, memory access tracking component 113 can determine that the list threshold is not satisfied. If the list threshold is not satisfied, at operation 425, the current value of the counters, such as counters 218, 228, 238 are maintained.

In response to determining, at operation 415, that the saturation threshold is satisfied, or determining, at operation 420, that the list threshold is satisfied, at operation 430, a recency event is initiated. For example, the processing logic can determine the occurrence of the recency event on memory device 130. In response to the occurrence of the recency event, the processing logic can decrement counters 218, 228, 238. FIG. 5 illustrates the occurrence of recency events 540 and 542. At recency events 540 and 542, the count value 502 and count value 504 are both decremented (i.e., reduced). Depending on the embodiment, the count values can be reduced by either a fixed amount or a percentage/fraction (e.g., by one half). At recency event 540, even after being reduced, both count value 502 and count value 504 remain above the eviction threshold 520, although, count value 504 falls below the cacheable threshold 510. At recency event 542, however, count value 502 falls below the eviction threshold 520. Thus, memory access tracking component 113 can add an indication of the corresponding region to eviction list 240, as described above with respect to operation 355.

At operation 435, it is determined whether the counter satisfies a criterion. For example, the processing logic can determine whether a value of counter 218 satisfies an evictable threshold criterion. In one embodiment, memory access tracking component 113 compares the value of counter 218 to an evictable threshold value. For example, FIG. 5 illustrates an evictable threshold value 520. If the count value is less than or equal to the evictable threshold value 520, memory access tracking component 113 can determine that the evictable threshold criterion is satisfied (i.e., that translation layer mapping information for the region 210 with which counter 218 is associated can be removed from host-resident translation layer mapping table 125). If the count value is greater than the evictable threshold value 520, memory access tracking component 113 can determine that the evictable threshold criterion is not satisfied. If the evictable threshold criterion is not satisfied, no further action is taken and processing returns to operation 405 when another memory access command is received.

At operation 440, a list is updated. For example, the processing logic can add an indication of the region to eviction list 240. In one embodiment, the eviction list 240 can be implemented as a first in, first out (FIFO) data structure. As described above, memory access tracking component 113 can reference eviction list 240 when making a recommendation to host system 120 of regions to de-activate. In one embodiment, operations 435 and 440 can be repeated for each counter, such as each of counters 218, 228, and 238. For each counter, after the value has been decremented at operation 430, the processing logic can compare the value to the evictable threshold criterion at operation 435. If the value of any of the counters satisfies the evictable threshold criterion, and the corresponding region was previously activated, an indication of that region is added to the eviction list at operation 440. If the value of any of the counters does not satisfy the evictable threshold criterion, or the corresponding region was not previously activated, the processing logic can continue to the next counter. Thus, the processing logic can perform operations 435 and 440 in a loop until all of the counters in the memory device have been examined.

Figure 6:
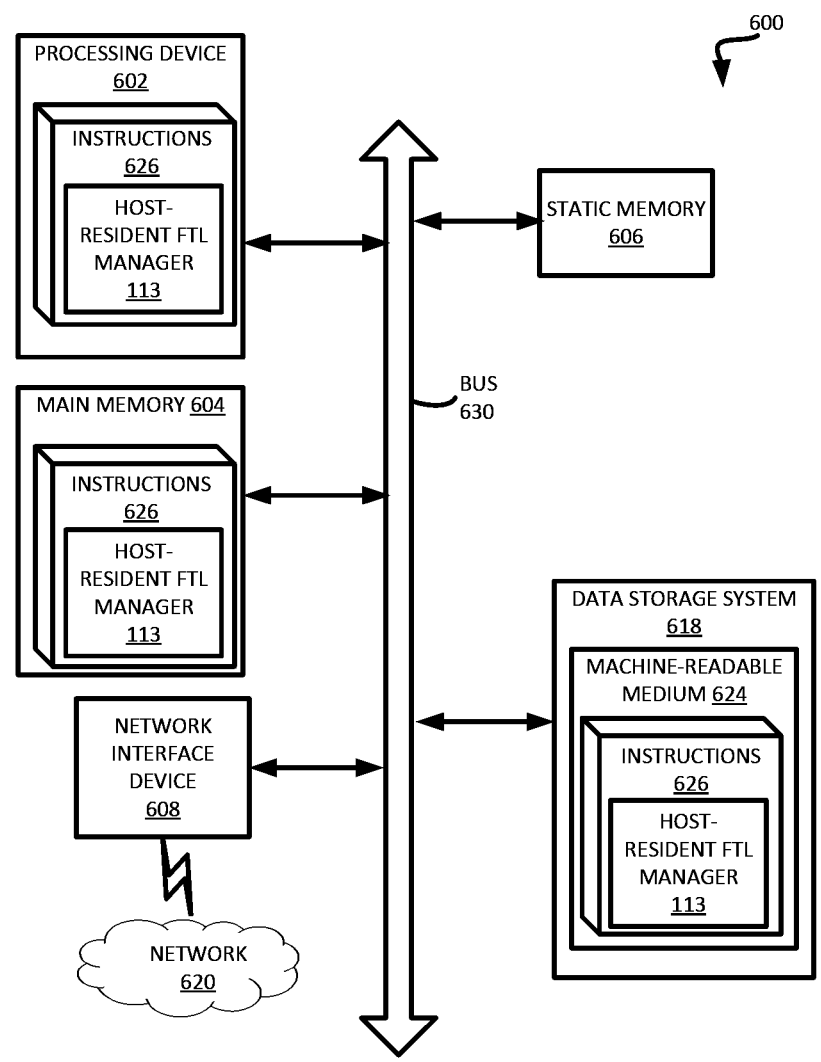
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory access tracking component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium, such a non-transitory computer-readable medium) on which is stored one or more sets of instructions 626 or software embodying any one or more of the methodologies or functions described herein. In one embodiment, this medium 624 is also writable by memory access tracking component 113, memory sub-system controller 115, or other components. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the memory access tracking component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining a plurality of counters to track a number of read operations performed on a corresponding plurality of regions of a logical address space of a memory device;
   incrementing, in response to receiving a read command comprising an indication of a sub-region of a respective region of the plurality of regions, a respective counter of the plurality of counters by an amount that varies based on a transfer length associated with the received read command; and
   responsive to incrementing the respective counter:
   (i) determining whether the respective counter is saturated;
   responsive to the respective counter being saturated, determining whether a number of saturated counters, of the plurality of counters, satisfies a saturation threshold criterion;
   responsive to the number of saturated counters satisfying the saturation threshold criterion, detecting an occurrence of a recency event on the memory device;
   periodically decrementing the plurality of counters in response to the occurrence of the recency event on the memory device;
   responsive to decrementing the plurality of counters, determining whether the respective counter satisfies an evictable threshold criterion; and
   responsive to the respective counter satisfying the evictable threshold criterion, adding an indication of the respective region to an eviction list; and
   (ii) determining whether one or more of the plurality of counters satisfies a cacheable threshold criterion; and
   responsive to the one or more of the plurality of counters satisfying the cacheable threshold criterion:
   sending a recommendation that translation layer mapping data corresponding to each region of the plurality of regions be stored in a host-resident translation layer mapping table; and
   receiving, subsequent to sending the recommendation, a request targeting one of the translation layer mapping data corresponding to each of the plurality of regions.

2. The method of claim 1, further comprising:
   responsive to at least one of i) the respective counter not being saturated or ii) the number of saturated counters not satisfying the saturation threshold criterion, determining whether i) a number of active regions, for which translation layer mapping data is stored in the host-resident translation layer mapping table, satisfies an active threshold criterion, and ii) a number of counters, having a value that satisfies the evictable threshold, satisfies a list threshold criterion; and
   responsive to determining that the number of active regions satisfies the active threshold criterion and the number of counters having a value that satisfies the evictable threshold satisfies a list threshold criterion, detecting the occurrence of the recency event on the memory device.

3. The method of claim 1, wherein decrementing the plurality of counters comprises reducing the respective values of the plurality of counters by one half.

4. A system comprising:
   a memory device; and
   a processing device, operatively coupled with the memory device, to perform operations comprising:
   maintaining a plurality of counters to track a number of read operations performed on a corresponding plurality of regions of a logical address space of the memory device;
   incrementing, in response to receiving a read command comprising an indication of a sub-region of a respective region of the plurality of regions, a respective counter of the plurality of counters by an amount that varies based on a transfer length associated with the received read command; and responsive to incrementing the respective counter:
   (i) determining whether the respective counter is saturated;
   responsive to the respective counter being saturated, determining whether a number of saturated counters, of the plurality of counters, satisfies a saturation threshold criterion;
   responsive to the number of saturated counters satisfying the saturation threshold criterion, detecting an occurrence of a recency event on the memory device;
   periodically decrementing the plurality of counters in response to the occurrence of the recency event on the memory device;
   responsive to decrementing the plurality of counters, determining whether the respective counter satisfies an evictable threshold criterion; and
   responsive to the respective counter satisfying the evictable threshold criterion, adding an indication of the respective region to an eviction list; and
   (ii) determining whether one or more of the plurality of counters satisfies a cacheable threshold criterion; and
   responsive to the one or more of the plurality of counters satisfying the cacheable threshold criterion:
   sending a recommendation that translation layer mapping data corresponding to each region of the plurality of regions be stored in a host-resident translation layer mapping table; and
   receiving, subsequent to sending the recommendation, a request targeting one of the translation layer mapping data corresponding to each of the plurality of regions.

5. The system of claim 4, wherein the processing device is to perform operations further comprising:
   responsive to at least one of i) the respective counter not being saturated or ii) the number of saturated counters not satisfying the saturation threshold criterion, determining whether i) a number of active regions, for which translation layer mapping data is stored in the host-resident translation layer mapping table, satisfies an active threshold criterion, and ii) a number of counters, having a value that satisfies the evictable threshold, satisfies a list threshold criterion; and responsive to determining that the number of active regions satisfies the active threshold criterion and the number of counters having a value that satisfies the evictable threshold satisfies a list threshold criterion, detecting the occurrence of the recency event on the memory device.

6. The system of claim 4, wherein decrementing the plurality of counters comprises reducing respective values of the plurality of counters by one half.

7. A non-transitory computer-readable storage medium comprising instructions that, when executed by a processing device, cause the processing device to perform operations comprising:

maintaining a plurality of counters to track a number of read operations performed on a corresponding plurality of regions of a logical address space of a memory device;

incrementing, in response to receiving a read command comprising an indication of a sub-region of a respective region of the plurality of regions, a respective counter of the plurality of counters by an amount that varies based on a transfer length associated with the received read command; and responsive to incrementing the respective counter:
(i) determining whether the respective counter is saturated;

responsive to the respective counter being saturated, determining whether a number of saturated counters, of the plurality of counters, satisfies a saturation threshold criterion;

responsive to the number of saturated counters satisfying the saturation threshold criterion, detecting an occurrence of a recency event on the memory device;

periodically decrementing the plurality of counters in response to the occurrence of the recency event on the memory device;

responsive to decrementing the plurality of counters, determining whether the respective counter satisfies an evictable threshold criterion; and responsive to the respective counter satisfying the evictable threshold criterion, adding an indication of the respective region to an eviction list; and (ii) determining whether one or more of the plurality of counters satisfies a cacheable threshold criterion; and responsive to the one or more of the plurality of counters satisfying the cacheable threshold criterion:

sending a recommendation that translation layer mapping data corresponding to each region of the plurality of regions be stored in a host-resident translation layer mapping table; and receiving, subsequent to sending the recommendation, a request targeting one of the translation layer mapping data corresponding to each of the plurality of regions.

8. The non-transitory computer-readable storage medium of claim 7, wherein the processing device to perform further operations comprising:

responsive to at least one of i) the respective counter not being saturated or ii) the number of saturated counters not satisfying the saturation threshold criterion, determining whether i) a number of active regions, for which translation layer mapping data is stored in the host-resident translation layer mapping table, satisfies an active threshold criterion, and ii) a number of counters, having a value that satisfies the evictable threshold, satisfies a list threshold criterion; and responsive to determining that the number of active regions satisfies the active threshold criterion and the number of counters having a value that satisfies the evictable threshold satisfies a list threshold criterion, detecting the occurrence of the recency event on the memory device.

9. The non-transitory computer-readable storage medium of claim 7, wherein decrementing the plurality of counters comprises reducing respective values of the plurality of counters by one half.

* * * * *